US008195753B2

(12) United States Patent
Vitaldevara et al.

(10) Patent No.: US 8,195,753 B2
(45) Date of Patent: Jun. 5, 2012

(54) HONORING USER PREFERENCES IN EMAIL SYSTEMS

(75) Inventors: Krishna C. Vitaldevara, Fremont, CA (US); Eliot C. Gillum, Mountain View, CA (US); Jason D. Walter, San Jose, CA (US); Mehrdad Bidgoli, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 12/350,022

(22) Filed: Jan. 7, 2009

(65) Prior Publication Data

US 2010/0174788 A1 Jul. 8, 2010

(51) Int. Cl.
*G06F 15/16* (2006.01)

(52) U.S. Cl. ...................................................... 709/206
(58) Field of Classification Search .................... 709/206
See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,453,327 B1 | 9/2002 | Nielsen | |
| 6,701,440 B1* | 3/2004 | Kim et al. ........................ | 726/24 |
| 6,772,196 B1 | 8/2004 | Kirsch et al. | |
| 7,155,738 B2 | 12/2006 | Zhu et al. | |
| 7,219,148 B2 | 5/2007 | Rounthwaite et al. | |
| 7,249,175 B1* | 7/2007 | Donaldson ..................... | 709/225 |
| 2002/0026487 A1* | 2/2002 | Ogilvie et al. ................ | 709/206 |
| 2002/0032727 A1 | 3/2002 | Dias et al. | |
| 2003/0225850 A1 | 12/2003 | Teague | |
| 2005/0025291 A1* | 2/2005 | Peled et al. ................ | 379/88.13 |
| 2005/0240617 A1 | 10/2005 | Lund et al. | |
| 2006/0031311 A1* | 2/2006 | Whitney et al. ............... | 709/206 |
| 2006/0031359 A1 | 2/2006 | Clegg et al. | |
| 2006/0168017 A1* | 7/2006 | Stern et al. .................... | 709/206 |
| 2006/0212522 A1 | 9/2006 | Walter et al. | |
| 2006/0288076 A1 | 12/2006 | Cowings et al. | |
| 2009/0089279 A1* | 4/2009 | Jeong et al. ........................ | 707/5 |

OTHER PUBLICATIONS jGuru: Fundamentals of the JavaMail API. http://web.archive.org/web/20040218204122/http://java.sun.com/developer/onlineTraining/JavaMail/contents.html. Feb. 2004. pp. 1-14.*
Klensin. RFC 2821. Simple Mail Transfer Protocol. Apr. 2001. pp. 1-17.*
TRUSTe and EPSILON, "Your Customers Hold the Key to Deliverability: Best Practices that Minimize Email Complaints," [http://trusteorg/pdf/minimize_email_complaints.pdf], Oct. 2006.
Goodman, Joshua, "Spam: Technologies and Policies," [http://research.microsoft.com/~Joshuago/spamtech.pdf], Copyright 2003 Microsoft Corp., Nov. 2003.
"Gmail Improves False-Positive Spam Detection," [http://googlesystem.blogspot.com/2006/10/gmail-improves-false-positive-spam.html], Oct. 2, 2006.
Segal, Richard, et al., "SpannGuru: An Enterprise Anti-Spam Filtering System," IBM Thomas J. Watson Research Center, [http://www.ceas.cc/papers-2004/126.pdf].

* cited by examiner

*Primary Examiner* — John Macilwinen
(74) *Attorney, Agent, or Firm* — Vierra Magen Marcus & DeNiro LLP

(57) ABSTRACT

In a distributed email system, user preferences respected more effectively by presenting messages marked for deletion to secondary messaging servers having access to user preferences. Messages marked for deletion by inbound servers are presented to secondary level servers having access to user white lists and the choice of whether to delete the suspect message is made by the secondary server.

20 Claims, 5 Drawing Sheets

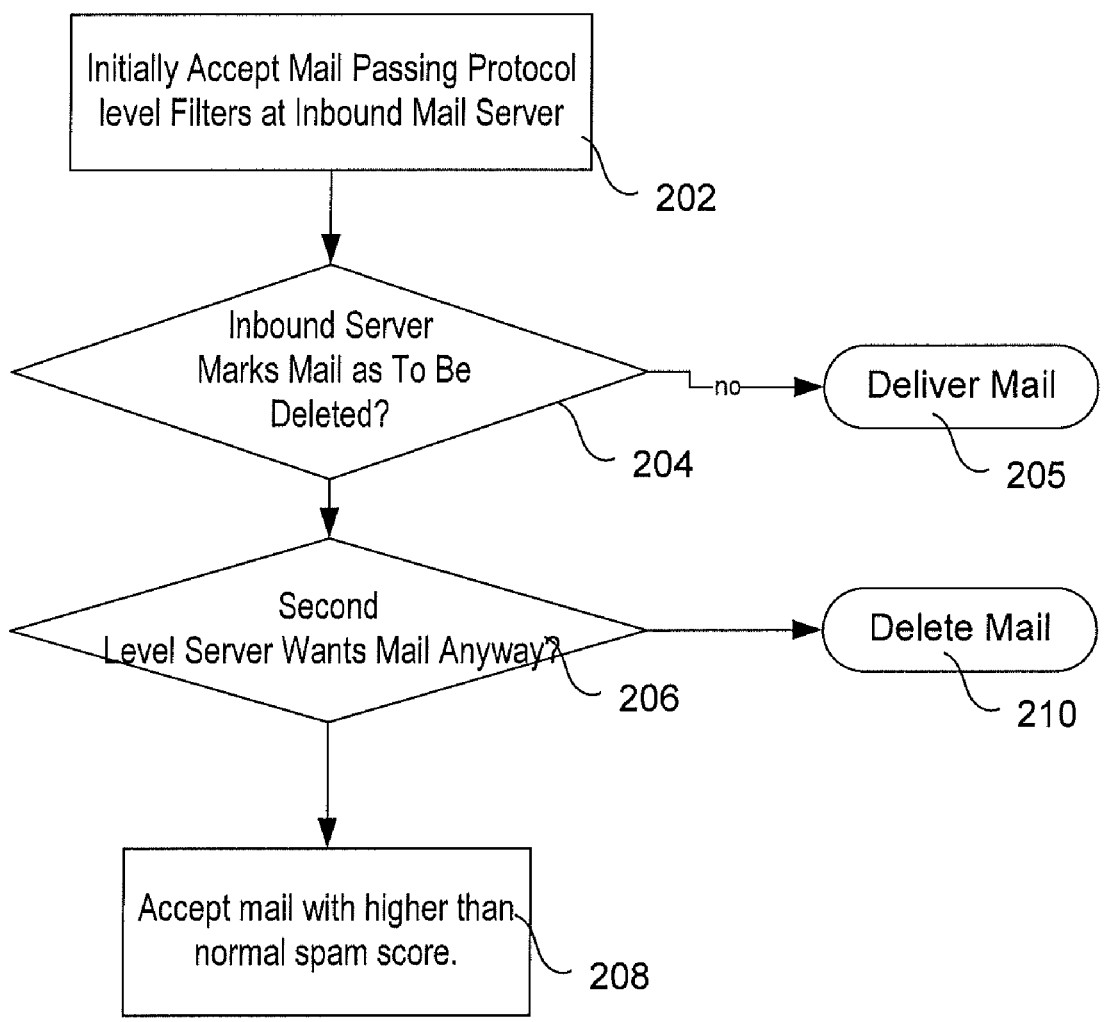

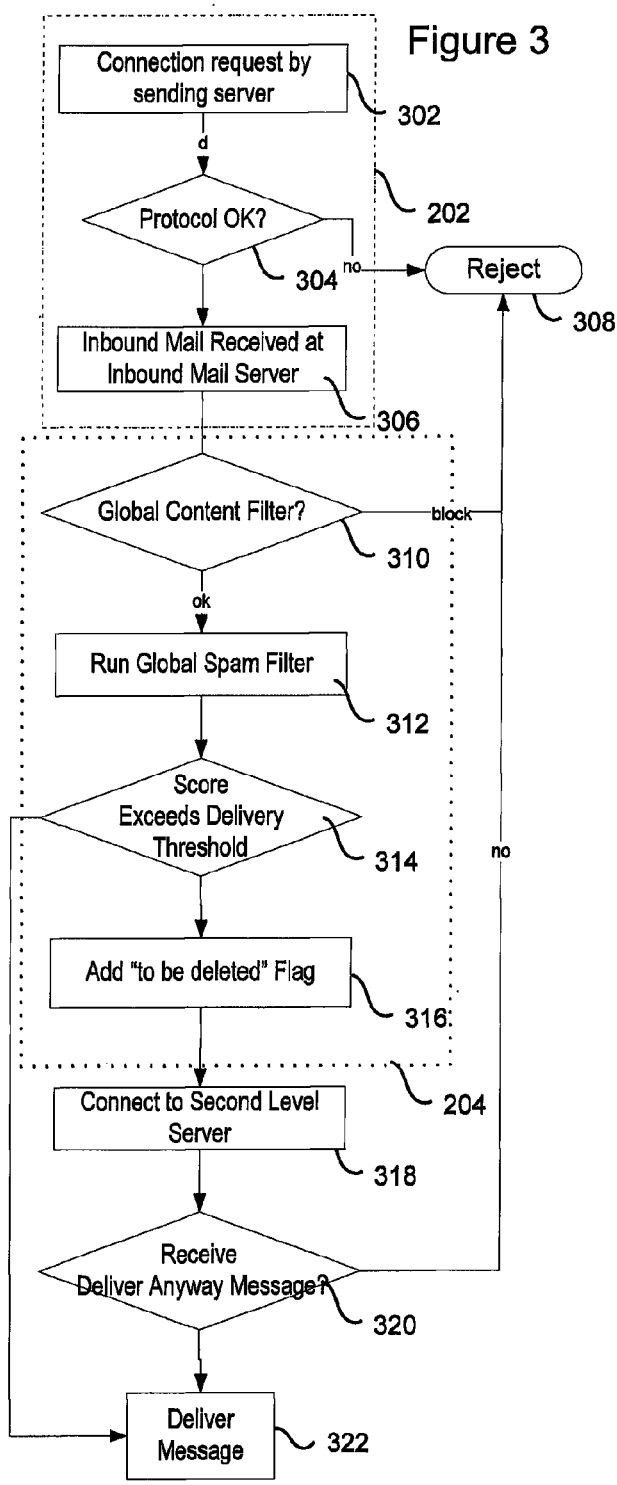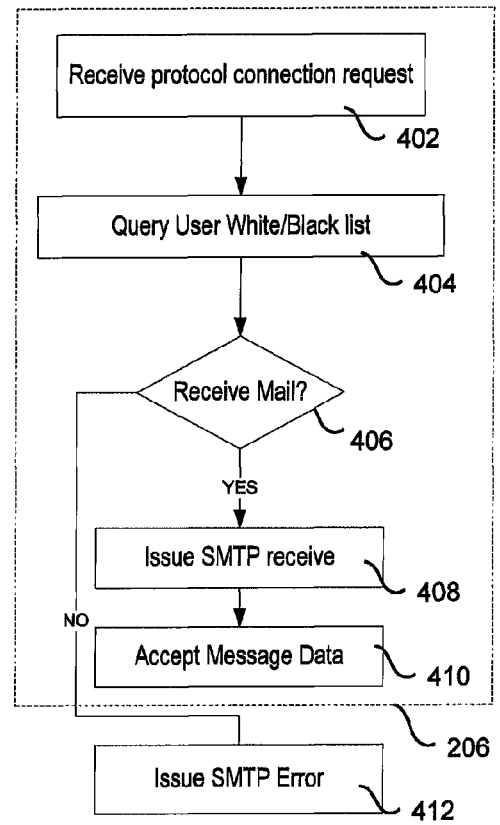

Figure 5A

```
R: 220 secondary.local
S: HELO inbound1.local
R: 250 Hello inbound1.local
S: MAIL FROM: sender@mydomain.com
R: 250 Ok
S: RCPT TO: friend@example.com
R: 250 Ok
S: DATA
R: 354 End data with <CR><LF>.<CR><LF>
S: Subject: test message
S: From: sender@mydomain.com
S: To: friend@example.com
S:
S: Hello,
S: This is a test.
S: Goodbye.
S: .
R: 250 Ok: queued as 12345
S: quit
R: 221 Bye
```

Figure 5B

```
R: 220 secondary.local
S: HELO inbound1.local
R: 250 Hello inbound1.local
S: MAIL FROM: sender@mydomain.com delete=1
R: 250 Ok
S: RCPT TO: friend@example.com
R: 250 Ok
S: ….
```

Figure 5C

```
R: 220 secondary.local
S: HELO inbound1.local
R: 250 Hello inbound1.local
S: MAIL FROM: sender@mydomain.com delete=1
R: 250 ok
S: RCPT TO: friend@example.com
R: 550 error
S: ….

S: quit
R: 221 Bye
```

HONORING USER PREFERENCES IN EMAIL SYSTEMS

BACKGROUND

One of the most common forms of email is provided by Email Service Providers (ESPs) such as Yahoo! Mail, Microsoft Hotmail, Google GMail, and other web-based email services.

Generally, such ESPs direct users running web-browsers to a cluster of computers which provide an email application to the user via the web-browser interface. However, other methods of accessing free email services, such as Post Office Protocol (POP) and Internet Message Access Protocol (IMAP) may be utilized.

ESPs use a multitude of processing devices to implement their services. Generally, the devices have dedicated sets of functionality within the service provider's system. Some devices serve as storage devices, user data stores and message transfer devices. Messages directed to users having accounts at an ESP are directed to the ESP's Message Transfer Agents (MTAs), which work with other devices within the ESP's server structure. In an architecture having a large number of mailboxes in a single location, mail acceptance servers are typically separated from storage servers, and there are generally many machines of each type.

SUMMARY

Technology is provided to enable user preferences to be respected more effectively by distributed email system. Inbound message transfer agents performing filtering on messages received in the system are more tolerant of user preferences by checking with secondary servers having access to user preferences before refusing or deleting suspect messages. Instead of automatically taking action on messages based on the inbound devices processing filters, suspect messages are presented to secondary level servers having access to user white lists and the choice of whether to delete the suspect message is made by the secondary server.

The technology is suited to systems where a plurality of processing devices are used, and technology is used to prevent nefarious messages and spam messages from reaching the end users of the system.

In one aspect, a method for receiving email in an email system having an inbound server and at least one secondary server is provided. A message is received at the inbound server and a determination made at the inbound server as to whether the message should be deleted. If so, the message is marked for deletion. Communication then occurs between the secondary server to determine whether the secondary server wishes to receive the message anyways in spite of the deletion marking. An indication is provided from the secondary server concerning whether the secondary server wishes to receive the message. If so, the message is delivered.

BRIEF DESCRIPTION OF THE DRAWINGS

FIG. 2 is flowchart illustrating one embodiment of the present technology

FIG. 3 is a flowchart illustrating steps occurring on an inbound message transfer agent.

FIG. 4 is a flowchart illustrating steps occurring on a secondary server.

FIGS. 5A, 5B and 5C illustrate an SMTP conversation between an inbound, sending server and a secondary, receiving server.

DETAILED DESCRIPTION

Technology is provided to enable user preferences, and particularly user safe list and block lists, to be used more effectively by an email system having a distributed computing load. The technology is suited to systems where a plurality of processing devices are used, and technology is used to prevent nefarious messages and spam messages from reaching the end users of the system. Message acceptance and some filtering occur at an inbound or "edge" server which may not be aware of individual user receipt preferences, such as individual white-listed user entries. Instead of automatically deleting messages based on the inbound devices processing filters, suspect messages are presented to secondary level servers having access to user white lists and the choice of whether to delete the suspect message is made by the secondary server.

Figure 1:
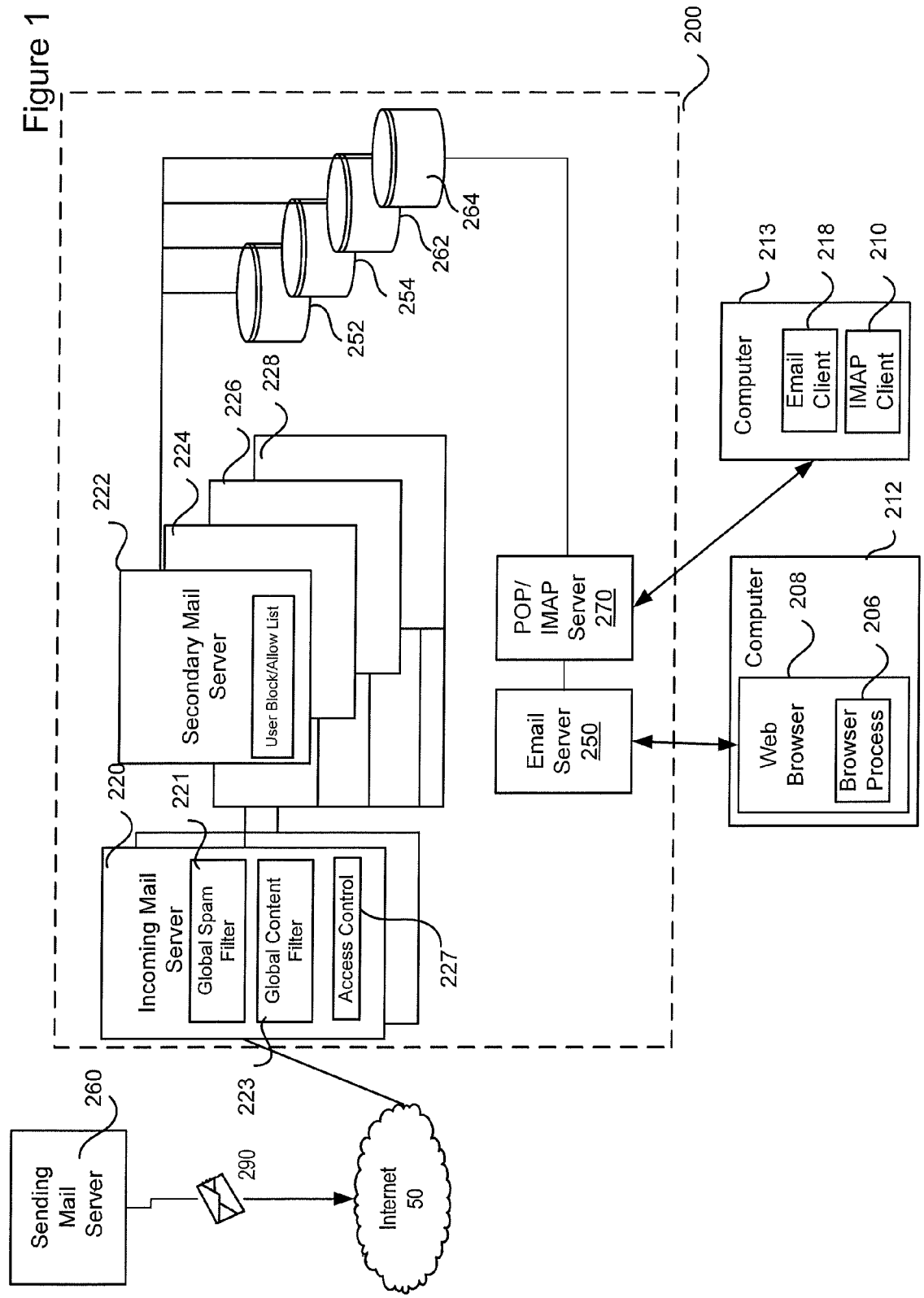
FIG. 1 is a block diagram of an email system.

FIG. 1 illustrated a simplified view of a distributed email system. The system uses a number of computing devices.

In the system of the present technology, an ESP 200 may use a system such as that shown in FIG. 1 having a number of computing devices to implement the method of the present technology. An exemplary computing device for implementing any of the servers shown in FIG. 1 is shown in FIG. 4.

FIG. 1 is a block level diagram of a system suitable for implementing the present technology. System 200 which may be implemented by an email service provider (ESP) may consist of, for example, an inbound email MTA 220 which comprises a number of processing devices, one or more secondary MTAs 222, 224, 226, 228 and user data storage units 252, 254, 262, 264. An email server 250 and a POP/IMAP server 270 may also be provided which allow users to access their email data after an appropriate authentication. System 200 allows users operating processing devices 212, 213 to access their email data. It should be understood that users may connect to system 200 via any number of public or private networks, including the Internet.

In a distributed system, workload may be shared processing devices with the work load divided into separate functions. Inbound email MTA 220 is essentially a front end or "edge" server to which emails 290 transmitted via the Internet (or other suitable network) from a sending server 260 to the system 200 are directed. The inbound MTA 220 handles connections from sending mail servers coupling to the inbound MTA via the Internet and performs an initial set of acceptance and filtering tasks on inbound email. Inbound email MTA 220 conducts an initial protocol and blacklist check to determine whether to allow an initial connection from the sending server 260. In one embodiment, certain IP addresses have been designated known spam senders and are blocked from even communicating with inbound MTA 220. If initial protocol checks are passed, inbound email MTA 220 may also include a global spam filter 221 and a global content filter 223. The global spam filter 221 is applied to incoming messages 290 and associates a spam score with each message. The global content filter 223 may comprise any of a number of content filtering methods including for example, methods to determine if the message contains phishing content, suspect links or viral attachments. Using one or more of the criteria in the global spam filter and/or the global content filter, the inbound email MTA makes an initial determination as to whether the message should be delivered to a user. In one embodiment, a message failing one or more tests at the inbound MTA will automatically deleted before ever reaching a user inbox.

Once the email is deemed deliverable, the inbound email MTA will forward messages to a second level, internal server 222, 224, 226, 228. Information on where to direct messages within the system may be provided by a user location database (not shown) which is a data store of storage location information for each of the users having a user account or email address within system 200. The user location database server stores information for allowing other servers in the system to direct mail within the system to storage locations on storage units 252, 254, 262, 264 based on the routing instructions in the system 200.

In one embodiment, communication between the inbound MTA and the internal MTAs is performed using SMTP protocols. The internal MTA units include instructions to parse email for storage on storage units 252, 254, 262, 264. Routing between the Inbound systems and internal systems may be performed using internal routing records for the system 200. Such information can be used by the inbound MTA to route email within the system 200 after the inbound MTA determines a user's storage location from a user data store (not shown). In accordance with the present technology, the inbound email MTA uses standard principles of simple mail transfer protocol (SMTP) to determine the delivery location in data storage units for a given user and route an incoming email to either the data storage units or a spooler by accessing MX records present the user data store which provide a user's routing domain. This allows convenient routing and customization of the internal structures in the ESP for various purposes, as described below. In addition, other information about where to send and store email data may be encoded in the internal MX record.

Access to user data by the users is performed by the email server 250 or POP/IMAP server 270. Email server 250 may comprise a web server which provides an email interface to a web browser 208 which institutes a browser process 206 on a user computer 212. Email server 250 can render email data from the data storage units to a user using computer 212 to access the email system 200. Likewise POP/IMAP server 270 can provide email data to a POP email client 218 or an IMAP client 210 on user computer 213.

FIG. 2 shows a flow-chart illustrating one embodiment of a method of the present technology. At step 202, mail for the user which passes any protocol level or basic connectivity filters is received. The protocol level filtering may be provided to reject mail which may not comply with standard protocols, which comes from a blacklisted set of IP addresses, or which meets some basic connectivity connection blocking criteria. In an alternative embodiment, basic protocol blocking need not be utilized. Alternatively, the system may accept all connections. At step 204, an initial decision is made as to whether mail will be deleted or refused based on one or more content filters. As described herein, the content filters may comprise, for example, a spam filter which assigns a spam likelihood score to each message accepted by the mail system. In one embodiment, all messages having a spam score higher than a given threshold would normally be immediately discarded. For example, if a spam filter rates mail on a scale of 1-10 with 1 being least likely to be spam and 10 being the most likely to be spam, in one embodiment the inbound MTA would discard all mail having a score above 9 automatically. If a message has a spam score below the initial content threshold, then it would be delivered to the secondary server at 205.

In accordance with the present technology, if a message has a spam score above the threshold or would otherwise have been discarded by the inbound MTA, then at step 206, rather than deleting message, the message is marked for deletion and information about the message is presented to a second level server which makes an independent determination as to whether to receive the message. As discussed below, this second level determination may be made based on user white lists and/or one or more user preferences stored at the second level server. If the second level server wants the message, at step 208, the second level server can accept the mail from the inbound MTA. If not, at step 210, the mail is deleted at the inbound MTA 220.

The method of FIG. 2 will be understood with reference to FIGS. 3 and 4. FIG. 3 illustrates steps performed by the incoming mail server and FIG. 4 illustrates steps performed by the secondary mail server. At step 302, an inbound email message 290 is received by the system via Internet 50. A message 290 is received by the inbound email server 220 from a sending server 260. Inbound email MTA 220 will receive email addressed to any user within the domain that, in this example might be "example.com." In step 304, an initial determination is made as to whether to accept the mail from the sending server. This "protocol" filter may comprise determining whether the sending server has an IP which is blocked by the incoming mail server or the communication is made with the proper messaging protocol.

If the initial connection is accepted at step 304, the inbound mail is received at the inbound server at 306. Next, at step 310, a global content filter is applied. The global content filter may comprise one of a number of filtering technologies, including a global blacklist or content filters which perform advanced filtering operations on messages with suspect content. For example, if a message contains embedded links, the filter can trace the links to determine whether the link is to a suspected phishing site and add warning information for the message when displayed to a user. Application of a global blacklist can cause rejection of the message at step 310. Alternatively, application of the global blacklist can categorize the message as one which would not normally be accepted and a "to be deleted" flag may be set by this filter.

The global content filter may comprise one or more edge filters including junk email filters such as Microsoft Smartscreen™, a third party antispam content filter, a phishing content protection filter, a sender ID check and local policy. The junk filtering technology evaluates the content of the messages and assigns the message a rating based on the probability that the message is junk e-mail. This rating may be stored as a message property called a spam confidence level (SCL) within the message itself. The SCL rating stays with the message as it is sent to other anti-spam protection layers. In one embodiment, if a message has an SCL rating above than a certain threshold, it is considered spam and a rule then deletes the message rather than send the message to the users' junk e-mail folders. If the message has a lower SCL rating than the threshold, the e-mail is delivered to the user's junk e-mail folder rather than to the inbox. Alternative email filtering technologies, such as those available from third parties, may be incorporated into this filter.

A phishing filter checks for e-mails which, for example, contain a link which might redirect users to a fraudulent web site. The Phishing Filter technology checks for potential phishing characteristics in e-mail, and dynamically checks the web sites where the links are directed. Sender ID further helps prevent phishing and spoofing schemes by verifying the IP address of the e-mail sender against the reported owner of the sending domain.

The global filter can utilize Sender ID as an independent check or to provide additional input to the junk e-mail filter process that determines if the e-mail or sender is legitimate.

After application of the global content filter, a global spam filter may be run at step 312. The global spam filter assigns a spam score to each message which reflects the likelihood that a particular message is spam. In conventional systems, those messages having a spam score exceeding certain threshold might be discarded at this point. At step 314, if the spam score of the message exceeds a threshold at 314, a "to be deleted" flag is added to the message at step 316. The flag can take any number of forms, but in one embodiment comprises information added to the SMTP MAIL FROM field of a message. As noted below, in connecting to the second level server to determine whether the second level server wants the message even though the spam score exceeds a threshold, the inbound server passes only a limited amount of information concerning the suspect message to allow the secondary server to make a determination concerning whether to accept the message. It should be recognized that the while in one embodiment the MAIL FROM field is utilized, other types of flags in other protocols may be utilized in accordance with the present technology.

Next, at step 318, the inbound server will connect to the secondary server and pass information concerning the message, including the "to be deleted" flag to the server. In one embodiment, the inbound email MTA 220 sends the message to the internal address using standard SMTP protocol, a modified version thereof, or an entirely different protocol executing all or a subset of the same steps as SMTP. In one embodiment, the inbound email MTA 220 will query the ID database for a destination server associated with a user storage location. The ID data store will return the storage location for a particular user which is transformed into to a routing domain.

In accordance with the routing information, the inbound email MTA 220 will try to route the message to the user's preferred storage location. The SMTP service in the inbound email MTA 200 performs the mail forwarding in a standard manner, forwarding inbound mails within the system using, for example, internal MX records created from the storage location and forwarding emails based on such MX records. This simplifies construction of the inbound MTA by allowing use of standard SMTP service components.

At step 320, the inbound server will then wait for an indication of whether to deliver the message or reject it from the secondary server. If the inbound server requests the message, then at step 322, the message is delivered.

FIG. 4 illustrates the process occurring on the secondary mail server to determine whether to accept the message flagged for deletion. At step 402, the secondary server receives the connection request. At step 404, the user white list and/or user preferences are checked to determine if any characteristic of the message renders the message acceptable. In one embodiment, a white list may comprise user addresses, domains or IPs specifically identified as acceptable. In an alternative embodiment, the list may include more advanced filters, including acceptable subject lines, signatures, domains or key words, deemed to identify acceptable mail by the user. User preferences may include a spam filter aggressiveness setting allowing the user to specify that the user does not wish to receive mail has a spam confidence level beyond a certain value. For example, a user may set the aggressiveness setting at 8 and higher—a mail which might normally result in deletion with a SCL of 7 could be sent to the user but not 8 or 9. A user may define a separate list of keywords that user does not necessarily want to deterministically map to override the delete verdict, but which relaxes the delete verdict. For example, if a user has a legitimate business with Pfizer and Viagra, then the user may wish some mails including the terms "Viagra" (commonly used in spam email) to be treated less harshly, obvious ones should still be deleted.

At step 406, if the list indicates one should accept the message, then at step 408, an accept mail command will be returned to the inbound mail server (which the inbound mail server acts on at step 320). If the mail is not acceptable, an error code is generated at step 412.

FIG. 5A illustrates a conventional SMTP email exchange between a sending server "S" in this case the inbound server, and a receiving server "R" in this case the secondary server.

FIG. 5B illustrates an exchange between a sending server where a "to be deleted" flag is inserted in the FROM field. In this example, the flag is the "delete-1" in the MAIL FROM field. The type and form of the flag may be varied in accordance with the present technology. As noted above, the flag indicates that the inbound server intends to delete the email based on the spam score. Next, the RCPT TO: field indicates the user for whom the mail is addressed. This field tells the secondary server which user's preferences should be checked. The response to the RCTP TO field indicates whether the secondary server is willing to accept the mail designated for deletion. In the example shown in FIG. 5B, the response to the MAIL FROM information is an accept command 250. FIG. 5C shows the example where the secondary server rejects the mail. In this example, the receiving server R issues a 550 error command. The inbound, sending server will understand this error message as an indicator to continue with the deletion of the message at the inbound server level. It should be understood that alternative methods of indicating deletion in other portions of the message, or in a separate communication between the inbound and secondary server, may be utilized with the technology.

Figure 6:
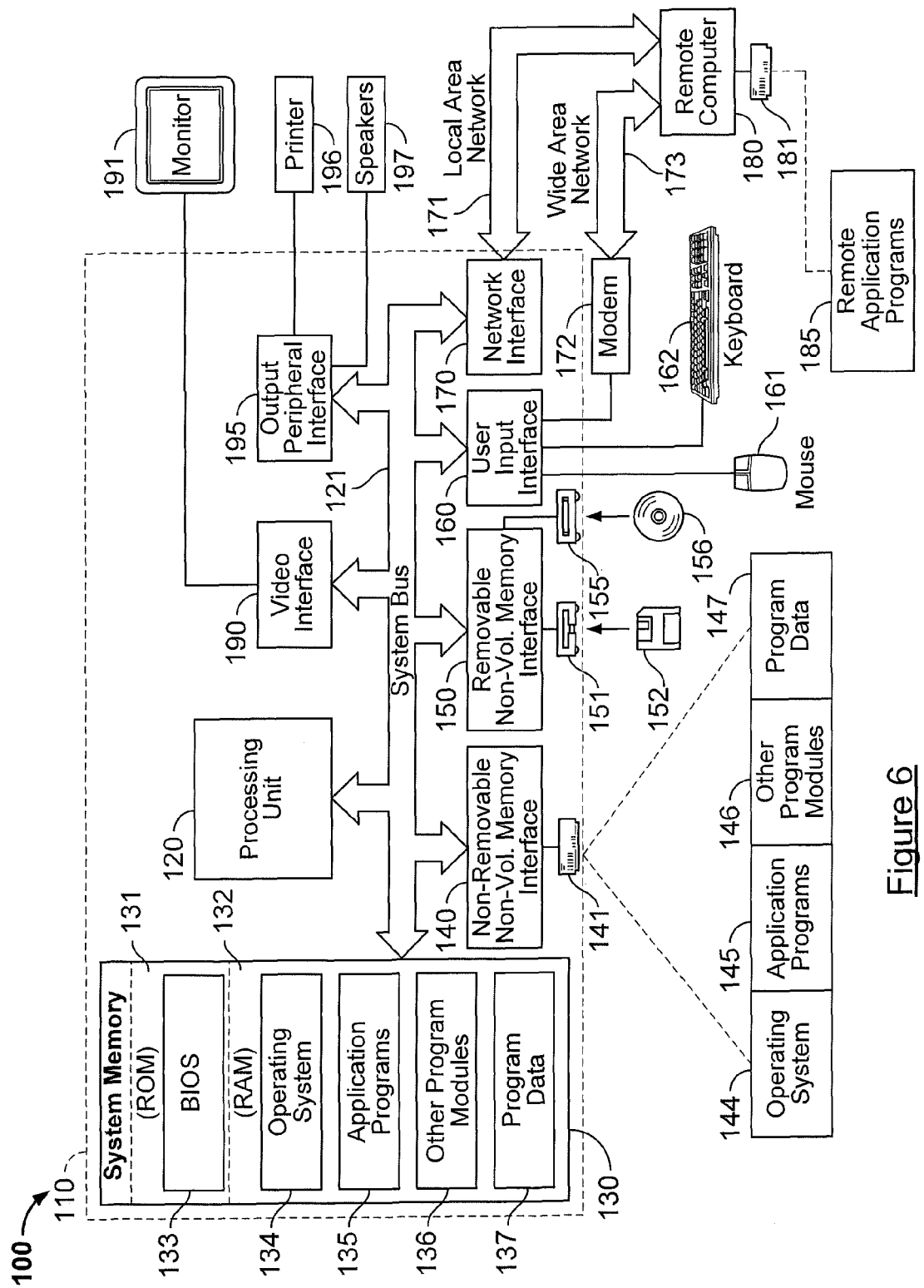
FIG. 6 illustrates a processing device suitable for implementing the present technology.

FIG. 6 illustrates an example of a suitable computing system environment 100 such as a computer suitable for implementing any of the processing devices or servers described herein.

With reference to FIG. 6, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, OM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that

We claim:

1. A method for receiving email in an email system having an inbound server and at least one secondary server communicating via a secure network within the system, the method comprising:
   receiving a message addressed to a user of the email system at the inbound server;
   determining at the inbound server whether the message should not be delivered to a storage location for the user, at the secondary server, and if so, marking the message for deletion;
   communicating with the secondary server via the secure network to determine whether the secondary server wishes to receive the message marked for deletion by the inbound server, the secondary server automatically determining to receive the message based on pre-defined preferences of the user; and
   receiving at the inbound server an indication from the secondary server concerning whether the secondary server wishes to receive the message; and
   accepting or rejecting the message at the inbound server based on the indication.

2. The method of claim 1 wherein the step of marking the message comprises inserting a to-be-deleted flag in a MAIL FROM, RCPT TO, or header of a message.

3. The method of claim 1 wherein the step of communicating includes communicating a portion of the message to the secondary server which includes the to-be-deleted marking.

4. The method of claim 3 wherein the portion of the message includes one or more senders of the message and wherein the secondary server determine that the MAIL FROM field matches a user safe list.

5. The method of claim 3 wherein the step of communicating includes communicating a portion of the message to the secondary server which includes a marked status and at least a FROM field of the message.

6. The method of claim 5 wherein the step of determining includes comparing the MAIL FROM field to the user preferences, the user preferences comprising at least one of user defined acceptable subject lines, acceptable signatures, acceptable domains, acceptable email addresses, acceptable key words, or a spam filter aggressiveness setting.

7. The method of claim 5 wherein the step of marking the message comprises having a to-be-deleted flag in the MAIL FROM command of SMTP interaction.

8. The method of claim 1 wherein the step of receiving an indication includes receiving one of an SMTP accept message or an SMTP error message.

9. The method of claim 1 wherein the step of receiving an indication includes receiving an indication to deliver the message when the secondary server determines that at least a portion of the message meets a user defined criterion for a message the user desires to receive.

10. The method of claim 1 wherein the step of determining includes applying a spam rating for the message and if the spam rating exceeds a threshold, marking the message for deletion.

11. A method for storing email in an email system having a plurality of inbound message servers communicating with sending message servers to receive messages addressed to users of the email system, and communicating with a secondary server via a secure network routing messages addressed to users to storage, comprising:
   receiving a request to connect to one of the plurality of inbound message servers to deliver a message for an addressee user of the email system;
   filtering the message at the one of the plurality of inbound servers to determine whether to reject the message and if so, marking the message for deletion;
   communicating information concerning the message including the marking for deletion to one of the secondary servers associated with a user storage location within the email system and via the secure network to determine whether the secondary server desires to receive the message marked for deletion, the secondary server making an automatic determination based on predefined preferences of the addressee user;
   receiving an indication at the one of the plurality of inbound servers of acceptance from the secondary server for the message;
   accepting the message at the inbound server; and
   delivering the message from the inbound server to the one of the secondary servers.

12. The method of claim 11 wherein the step of determining includes applying a spam rating for the message and if the spam rating exceeds a threshold, marking the message for deletion.

13. The method of claim 12 wherein the step of communicating includes communicating a portion of the message to the secondary server which includes the marking.

14. The method of claim 13 wherein the step of receiving an indication includes receiving an indication to deliver the message when the secondary server determines that at least a portion of the message meets a per user defined criterion for a message.

15. The method of claim 14 wherein the step of receiving an indication includes receiving one of an SMTP accept message or an SMTP error message.

16. The method of claim 15 wherein the step of marking the message comprises inserting a to-be-deleted flag in a MAIL FROM command of SMTP interaction.

17. A computer implemented method for honoring user safe lists in an enterprise email messaging system including at least one inbound server receiving messages addressed to users of the enterprise email messaging system and at least one secondary server storing messages for said users of the enterprise messaging system, the at least one secondary server communicating with the at least one inbound server via a secure network, the secondary server having access to a user's predefined preferences, the method comprising:
   receiving a message at the inbound server for an addressee of the enterprise email messaging system;
   determining a spam rating for the message at the inbound server, and if the spam rating exceeds a threshold, marking the message for deletion;
   communicating using SMTP protocol a marked status for deletion to the secondary server along with message information;
   automatically determining, at the secondary server, whether to accept the message by comparing the message information to at least the user preferences, the predefined user preferences defined by the addressee of the message;

communicating an indication between the secondary server and the inbound server to transmit the message to the secondary server for storage for a user of the enterprise email messaging system.

18. The method of claim 17 wherein the step of communicating includes sending one of an SMTP accept message or an SMTP error message.

19. The method of claim 17 further including the step of determining at the inbound server whether the message includes objectionable links, and if so, marking the message for deletion.

20. The method of claim 17 further including the step of delivering the message after receiving said indication.

\* \* \* \* \*